US008974208B2

(12) United States Patent  
Goumault

(10) Patent No.: US 8,974,208 B2  
(45) Date of Patent: Mar. 10, 2015

(54) MOULD FOR VULCANIZING A TIRE, INSTALLATION AND METHOD FOR REGULATING THE TEMPERATURE OF THE MOULD

(75) Inventor: Pascal Goumault, Riom (FR)

(73) Assignees: Michelin Recherche et Technique S.A., Granges-Paccot (CH); Compagnie Generale des Etablissements Michelin, Clermont-Ferrand (FR)

( * ) Notice: Subject to any disclaimer, the term of this patent is extended or adjusted under 35 U.S.C. 154(b) by 1179 days.

(21) Appl. No.: 12/937,507

(22) PCT Filed: Apr. 8, 2009

(86) PCT No.: PCT/FR2009/050613
§ 371 (c)(1),
(2), (4) Date: Mar. 21, 2011

(87) PCT Pub. No.: WO2009/136071
PCT Pub. Date: Nov. 12, 2009

(65) Prior Publication Data
US 2011/0180958 A1    Jul. 28, 2011

(30) Foreign Application Priority Data

Apr. 11, 2008   (FR) ..................................... 08 52446

(51) Int. Cl.
*B29C 33/04*   (2006.01)
*B29D 30/06*   (2006.01)
*B29L 30/00*   (2006.01)

(52) U.S. Cl.
CPC ............ *B29D 30/0606* (2013.01); *B29C 33/04* (2013.01); *B29D 2030/0667* (2013.01); *B29D 2030/0677* (2013.01); *B29L 2030/00* (2013.01)
USPC ............................................ 425/40; 264/326

(58) Field of Classification Search
CPC ............................... B29D 30/06; B29D 33/04
USPC ...................................... 264/326; 425/40
See application file for complete search history.

(56) References Cited

U.S. PATENT DOCUMENTS

| 1,469,747 | A | | 10/1923 | Winter |
| 1,544,002 | A | * | 6/1925 | Grove ............................ 425/40 |
| 5,173,308 | A | | 12/1992 | Scantland et al. |

FOREIGN PATENT DOCUMENTS

| EP | 0 578 105 | 1/1994 |
| EP | 1 743 755 | 1/2007 |

* cited by examiner

*Primary Examiner* — Galen Hauth
(74) *Attorney, Agent, or Firm* — Cozen O'Connor

(57) ABSTRACT

A mold for vulcanizing a blank tire has an overall shape that is annular about an axis of revolution and includes a configuration for channelling a heat-transfer liquid in a substantially circular path about the axis. The channelling configuration includes an annular wall around the axis, separating at least two chambers in which the heat-transfer liquid circulates. Furthermore, a downstream end (respectively an upstream end) of one of the chambers has substantially the same angular position with respect to the substantially circular path as the downstream (respectively upstream) end of the other of the chambers. The mold is additionally configured for circulating the liquid in opposite directions in the two chambers.

16 Claims, 3 Drawing Sheets

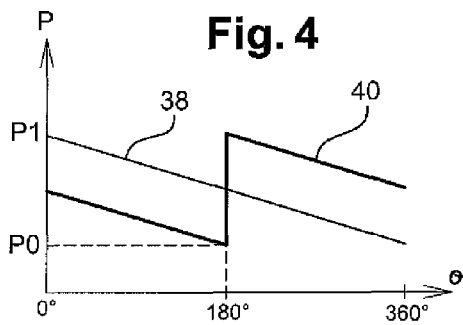
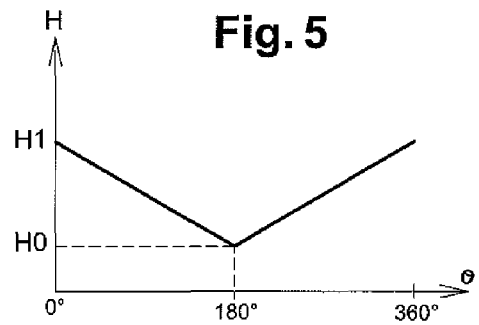
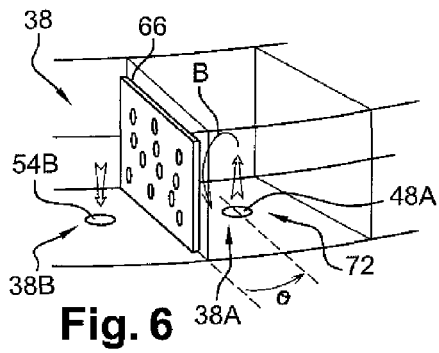
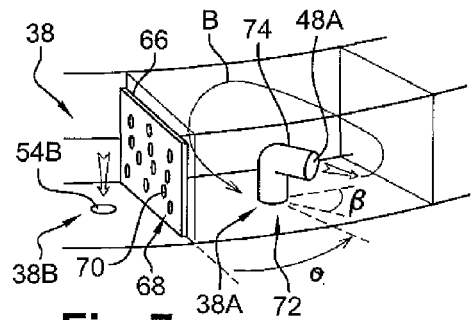
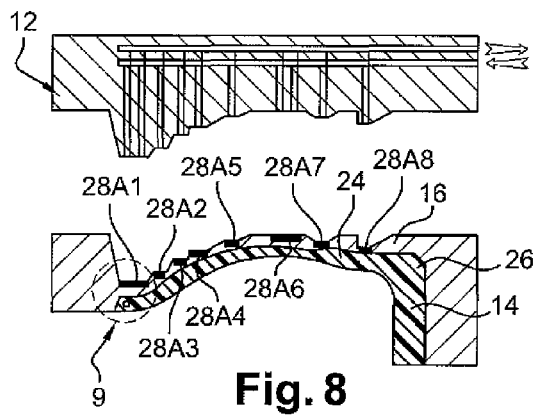
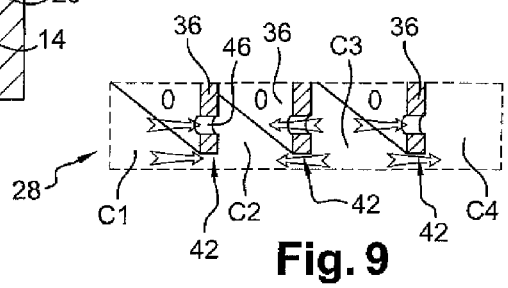

MOULD FOR VULCANIZING A TIRE, INSTALLATION AND METHOD FOR REGULATING THE TEMPERATURE OF THE MOULD

RELATED APPLICATION

This is a U.S. National Phase Application under 35 USC 371 of International Application PCT/FR2009/050613, filed on Apr. 8, 2009.

This application claims the priority of French patent application Ser. No. 08/52446 filed Apr. 11, 2008, the entire content of which is hereby incorporated by reference.

FIELD OF THE INVENTION

The present invention concerns the technical field of tires for automobile vehicles and more particularly the fabrication of these tires.

BACKGROUND OF THE INVENTION

A tire conventionally has a generally torroidal shape and includes two lateral parts forming sidewalls joined by a crown part forming a tread.

The thickness of the tire generally varies according to the part concerned. For example, in the case of a tire intended to be fitted to a roadwork type vehicle, the crown part forming the tread may have a thickness of 30 cm while the lateral parts forming the sidewalls each have a thickness of approximately 2 to 3 cm.

It is known to fabricate a tire by heating a blank tire in a mould of annular general shape around an axis of revolution. Heating the blank tire causes its vulcanization. As the tread is thicker than each of the sidewalls, it is necessary to distribute the heat appropriately in the mould in order to transfer more calories into the tread than into a sidewall. It is known to master this heat distribution by evacuating excess calories in the parts of the mould in contact with the sidewalls. The excess calories are evacuated by means of a cooling heat-transfer liquid circulating in the parts of the mould in contact with the sidewalls, more particularly in an annular passage of the mould extending around the axis of the mould. The passage includes a liquid admission inlet and a liquid discharge outlet situated angularly in the vicinity of the admission inlet so that the liquid travels a substantially complete turn in the passage.

Because it exchanges heat with the mould, the temperature of the heat-transfer liquid increases along its circular path in the passage with the result that the cooling of the mould by the heat-transfer liquid is less effective at the end of the travel of the liquid in the passage than at the beginning. There is therefore a relatively large temperature difference of the heat-transfer liquid between the liquid inlet and the liquid outlet of the passage.

It is possible to reduce the temperature difference between the liquid entry into the passage and the liquid outlet from the passage by increasing the flow rate at which the liquid is admitted. This limits the duration of the heat transfer between the mould and the liquid as the liquid circulates and thus reduces the temperature difference of the liquid between the inlet and the outlet.

However, this solution is not entirely satisfactory.

SUMMARY OF THE INVENTION

An object of the invention is notably to optimize the homogeneity of the cooling of the parts of the mould in contact with the sidewalls of the tire using simple and effective means.

To this end, one aspect of the invention is directed to a mould for vulcanizing a blank tire, the mould having an overall shape that is annular about an axis of revolution and including means for channelling a heat-transfer liquid in a substantially circular path about the axis, wherein the channelling means include an annular wall around the axis, separating at least two chambers in which the heat-transfer liquid circulates, a downstream (respectively upstream) end of one of the chambers has substantially the same angular position with respect to the substantially circular path as the downstream (respectively upstream) end of the other of the chambers, and the mould additionally includes means for circulating the liquid in opposite directions in the two chambers.

Thanks to the relative disposition of the ends of the two chambers and to the circulation of the liquid in opposite directions in the two chambers, the average temperature of the area in thermal contact with the channelling means comprising the two chambers is relatively homogeneous. The heat-transfer liquid at the start of its passage through a first, relatively cold chamber removes more heat from the area of the mould in contact with this first chamber than the heat-transfer liquid at the path end in the second, relatively hotter chamber, so that the average temperature of the area in contact with the two chambers is relatively consistent. By "wall" is meant a relatively thin partition so that the two chambers are sufficiently close to thermally influence conjointly the area in contact with the mould. Accordingly, the temperature is substantially constant at any point on the circumference of the chambers, considered as a single heat-exchanger, and corresponds approximately to the average temperature of the temperature of the liquids circulating in the two chambers. As a result the temperature difference between the surface of the mould and the two chambers considered as a single heat-exchanger is substantially constant, which solves the problem as stated.

Another aspect of the invention is directed to a mould for vulcanizing a blank tire, the mould having an overall shape that is annular about an axis of revolution and including means for channelling a heat-transfer liquid in a substantially circular path about the axis, wherein the channelling means include an annular wall around the axis, separating at least two chambers in which the heat-transfer liquid circulates, a downstream (respectively upstream) end of one of the chambers is disposed substantially diametrically opposite the downstream (respectively upstream) end of the other of the chambers, and the mould additionally includes means for circulating the liquid in the same direction in the two chambers.

A mould according to least one embodiment of the invention may further have one or more of the following features:
    the wall thermally couples the two chambers;
    the wall is produced in a thermally conductive material;
    the wall includes means for passing the liquid from one chamber to the other;
    the passage means include an edge for the liquid to overflow alternately into one chamber and then into the other;
    the wall extends substantially parallel to the axis;
    at least one chamber includes a wall separating an upstream end and a downstream end of the chamber;
    the separating wall includes means for passing the liquid between the two ends;
    the passage means include orifices for the heat-transfer liquid to pass from one chamber to the other;
    the wall separating the two ends is produced in a porous material permeable to the liquid circulating in the chamber;

the area of the section of each chamber evolves angularly about the axis oppositely, for example decreases in the direction from an upstream end to a downstream end of the chamber;

the upstream end being provided with at least one inlet orifice, the orifice is delimited by means for orienting the flow of liquid adapted to direct part of the flow into a loop extending between the inlet orifice and the wall separating the upstream ends and downstream ends of the chamber;

the orientation means are adapted to direct part of the flow in a direction substantially orthogonal to the axis of the mould.

Another aspect of the invention is directed to an installation for regulating the temperature of a mould of the invention, including means for reversing the direction of circulation of the liquid in the chambers of the mould at a predetermined frequency.

Another aspect of the invention is directed to an installation for regulating the temperature of a mould of the invention, wherein the direction of circulation of the liquid in each chamber is reversed at a predetermined frequency.

BRIEF DESCRIPTION OF THE DRAWINGS

The invention will be better understood on reading the following description, given by way of example only and with reference to the drawings, in which:

FIG. 4 is a graph representing two curves of evolution of the pressure of the liquid in respective chambers of FIG. 2 as a function of an angle of rotation about the axis of the mould;

FIG. 5 is a graph representing a curve of evolution of the height of the annular wall from FIG. 3 as a function of an angle of rotation about the axis;

FIG. 6 is a partial diagrammatic view of a first variant of a chamber from FIG. 2 comprising a wall for separating its upstream and downstream ends;

FIG. 7 is a partial diagrammatic view of a second variant of the chamber from FIG. 2 comprising a wall for separating its downstream and upstream ends;

FIG. 8 is a diagrammatic view of a temperature regulation installation for a mould of a third embodiment of the invention;

FIG. 9 is a diagrammatic view to a larger scale of the circled part of FIG. 8;

DETAILED DESCRIPTION OF THE DRAWINGS

Figure 1:
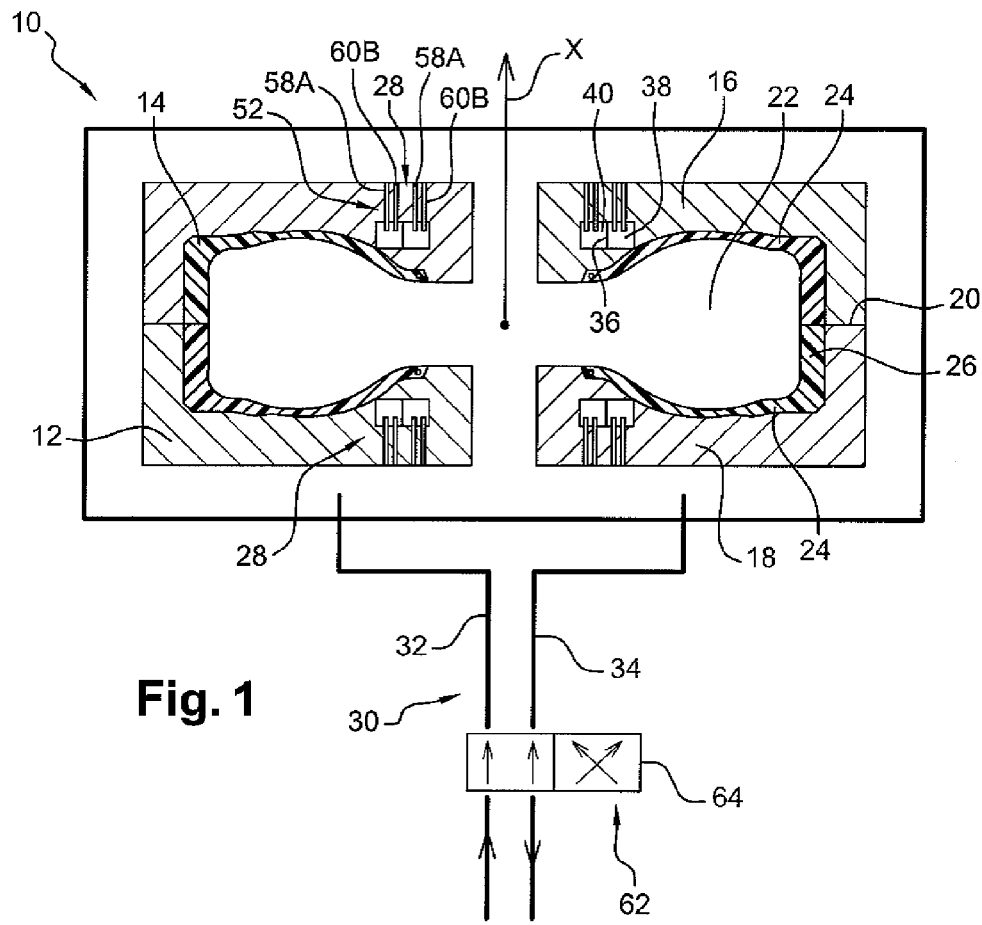
FIG. 1 is a diagrammatic view of a temperature regulation installation of a mould of a first embodiment of the invention.

FIG. 1 represents an installation according to the invention and generally referenced 10.

The installation 10 is for regulating the temperature of a mould 12 of the invention. The mould 12 is particularly suitable for vulcanizing a blank tire 14 for automobile vehicles. In particular, the mould 12 has an annular shape around a revolution axis X.

The mould 12 includes two complementary half-moulds, respectively referred to as the "lower" half-mould 18 and the "upper" half-mould 16. Each half-mould 16 and 18 has a sealing plane 20 and an internal wall adapted to be in contact with the blank tire 14 during vulcanization. Imprints (not shown) are engraved on this inside wall.

The central part 22 of the mould 12 also includes a membrane (not shown) adapted to be filled with steam under pressure or water during vulcanization of the tire 14, so as to press the blank tire 14 against the imprints etched in the internal wall of the mould 12 and thus to impart the final shape to the tire 14, as shown in FIG. 1.

Thus, as shown in FIG. 1, the tire 14 has a final torroidal shape and includes two lateral parts 24 forming sidewalls connected by a crown part 26 forming a tread. It is notably seen in this figure that each sidewall 24 has a thickness less than the thickness of the tread 26.

In order to take these thickness differences into account during vulcanization and thus to distribute the heat appropriately in the mould 12 by transmitting more calories into the tread 26 than into the sidewalls 24, the mould 12 also includes means 28 for channelling cooling heat-transfer liquid along a substantially circular path about the axis X (FIG. 2) lying in an area of the mould 12 in contact with the sidewalls 24. In this example, each half-mould 16 and 18 includes channelling means 28.

The liquid circulating in the means 28 is intended to absorb calories from the area of the mould 12 in contact with the sidewalls 24, thus enabling the temperature of the mould 12 in contact with the sidewalls 24 to be kept lower than the vulcanization temperature of the core of the tread 26.

The installation 10 further includes a circuit 30 for feeding with heat-transfer liquid channelling means 28 comprising a first main low-temperature heat-transfer liquid feed branch 32, called the "admission branch", and a second main branch 34 for evacuating the heat-transfer liquid after flowing in the channelling means 28, called the "discharge branch".

The "upper" half-mould 16 represented in FIGS. 2 to 9 is described in more detail in the remainder of the description. The detailed description of the half-mould 16 of course applies equally to the "lower" half-mould 18 represented in FIG. 1.

Figures 2, 3:
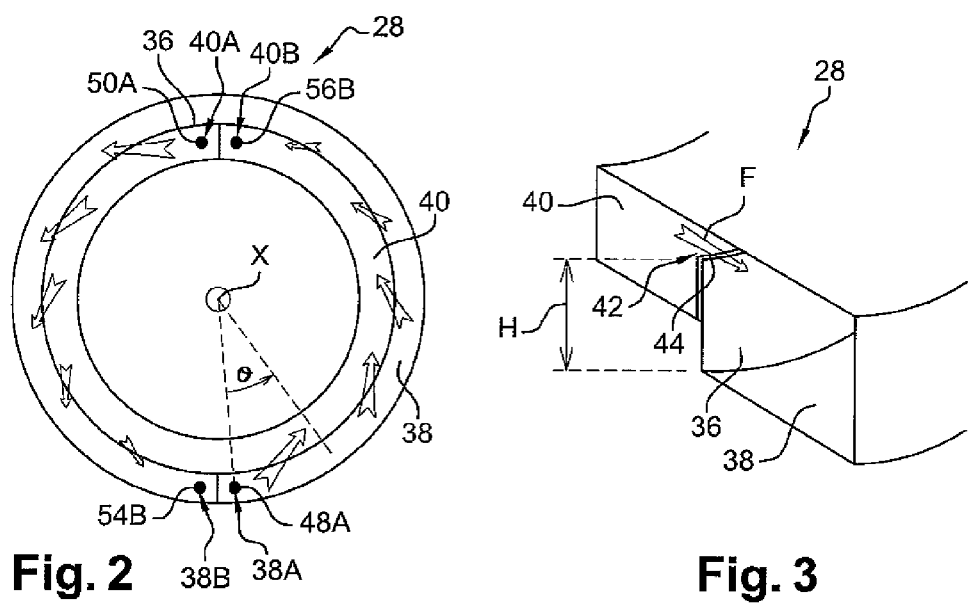
FIG. 2 is a diagrammatic view of channelling means of the mould from FIG. 1 comprising two fluid circulation passages.
FIG. 3 is a perspective view of the sections of chambers along the line 3-3 in FIG. 2, the chambers being separated by an annular wall.

The channelling means 28 of the half-mould 16 more particularly include an annular wall 36 around the axis X separating at least two heat-transfer liquid circulation chambers 38 and 40 (FIG. 2). In the example described, the annular wall 36 extends substantially parallel to the axis of revolution X and the section of the chambers 38 and 40 is of rectangular general shape (FIG. 3).

In a first embodiment of the invention, the half-mould 16 further includes means 52 for circulating the heat-transfer liquid in identical directions in the two chambers 38, 40, on the one hand between the upstream end 38A and the downstream end 38B of the chamber 38 and on the other hand between the upstream end 40A and the downstream end 40B of the chamber 40. The circulating means 52 are intended to connect upstream and downstream ends of each of the chambers to the heat-transfer liquid feed circuit to enable circulation of liquid within the chambers in identical directions. More particularly, inlet orifices 48A, 50A and outlet orifices 54B, 56B are respectively formed in the upstream ends 38A, 40A and the downstream ends 38B, 40B.

The circulating means 52 include for each chamber 38, 40, upstream means 58A for connecting the liquid admission branch 32 to the inlet orifice 48A, 50A of each chamber 38, 40 and downstream means 60B for connecting the discharge branch 34 of the liquid to the outlet orifice 54B, 56B of each chamber 38, 40.

Moreover, as shown in FIG. 2, the upstream end 38A of one of the chambers 38 is disposed substantially diametrically opposite the upstream end 40A of the other chamber 40. Likewise the downstream ends 38B, 40B of the two chambers 38, 40. This arrangement (central symmetry about the axis X) makes it possible to produce symmetrical circulation of the liquids in the chambers of the half-mould and thus to optimize spatial temperature homogenization.

Figure 11:
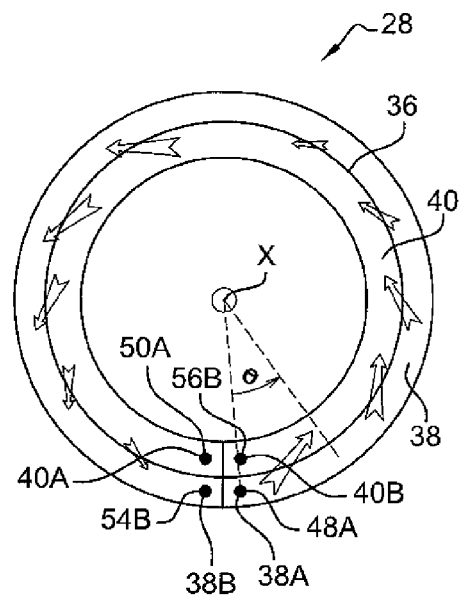
FIG. 11 is a diagrammatic view of channelling means of a mould of a second embodiment of the invention.

In a second embodiment of the invention shown in FIG. 11, the half-mould includes means for circulating the heat-transfer liquid in opposite directions. In FIG. 11 elements analogous to those of FIG. 2 are designated by the same references. In this case, the upstream end of one of the chambers has substantially the same angular position relative to the substantially circular path of the channelling means about the axis X than the upstream end of the other chamber. Likewise the downstream ends of the two chambers.

Moreover, to optimize temperature homogenization in the area in contact with the channelling means, the wall 36 preferably thermally couples the two chambers 38 and 40. The expression "thermally couples" means that the wall 36 includes areas having a relatively low thermal resistance to enable transfer of heat between the two chambers 38 and 40.

To effect the thermal coupling of the two chambers 38 and 40, the wall 36 preferably includes means 42 for passing the liquid from one chamber 38, 40 to the other 40, 38. In the example shown in FIG. 3, the passage means 42 include an edge 44 of height H over which the liquid overflows alternately into one chamber 38, 40 then the other 40, 38. The annular wall 36 may be made from a thermally conductive material.

The overflow edge 44 has a height H that varies as a function of a polar angle θ (see FIG. 5) defined in a system having for its pole the axis X and for its origin polar axis (θ=0°) the half-segment passing through the axis X and the centre of an inlet orifice 48A of the chamber 38 formed at an upstream end 38A of the chamber 38. The height H of the edge 44 varies in such a manner that, for θ varying from 0° to 180° the liquid overflows from the chamber 38 into the chamber 40 and for θ varying from 180° to 360°, the liquid overflows from the chamber 40 into the chamber 38, as shown in FIG. 2 by arrows F the size of which increases in proportion to the flow of liquid passing from one chamber to the other.

The variation of the height H takes account of the pressure drop in the liquid circulating in the chambers. As represented on the FIG. 4 graph (continuous line curve), the pressure of the liquid in the chamber 38 decreases substantially linearly over the path in the chamber 38 from a maximum value P1 at the upstream end (θ=0°) to a minimum value P0 at the downstream end (θ slightly less than 360°). The evolution of the pressure of the liquid circulating in the other chamber 40 is substantially identical to that in the chamber 38 (discontinuous line curve in FIG. 4). Thus the discontinuous line curve is offset from the continuous line curve along the abscissa axis by 180°.

The variation of the height H of the wall follows the evolution of the curve represented in FIG. 5. In a first half of the half-mould 16, i.e. for a value of θ varying from 0° to 180°, the value of the height H of the wall decreases from a maximum value H1 for θ=0° to a minimum value H0 for θ=180°. In this first half, the height of the wall 36 decreases from H1 to H0, which enables the liquid to overflow from the chamber 38 into the other chamber 40 even after a pressure drop in the liquid.

In the second half of the half-mould 16, i.e. for a value of θ varying from 180° to 360°, the height of the wall 36 also varies from H1 to H0 so that the liquid overflows from the chamber 40 to the other chamber 38.

Alternatively, the height of the overflow edge 44 may be constant in the half-mould 16. In this case, in order to cause the liquid to circulate from one chamber to the other, the section area of each of the chambers evolves angularly around the axis (X) oppositely from one to the other, for example so as to decrease in the direction from the upstream end toward the downstream end of each chamber. This makes it possible to compensate the pressure drop in the liquid along its path in the chamber. The smaller the area of the section of the chamber, the greater the pressure of the liquid in the chamber. Thus in FIG. 3 it is seen that the area of the section of the chamber 40 is less than the area of the section of the chamber 38 so that the pressure of the liquid in the chamber 40 is higher than the pressure of the liquid in the chamber 38, which makes it possible to create a liquid flow F from the chamber 40 to the chamber 38.

Moreover, to homogenize the temperature also in time, the installation 10 further includes means 62 for reversing the direction of circulation of the liquid at a predetermined frequency. These circulation reversing means 62 include for example a bistable hydraulic distributor 64 of 4/2 type (FIG. 1).

In the remainder of the description the chamber 38 represented in FIGS. 6 and 7 is described in detail. Of course, the detailed description of the chamber 38 applies equally to the chamber 40.

The chamber 38 includes a wall 66 separating its upstream end 38A and its downstream end 38B. This separation minimizes undesirable turbulence liable to occur between the upstream end 38A and the downstream end 38B of the chamber 38, notably between the inlet orifice 48A and the outlet orifice 50A of the chamber 38.

As shown in detail for the chamber 38 in FIGS. 6 and 7, the separating wall 66 preferably includes means 68 for passing the liquid between the two ends 38A, 38B of the chamber 38. These passage means 68 make it possible to reduce the temperature difference between the upstream end 38A and the downstream end 38B of the chamber 38. The passage means 68 include for example liquid communication orifices 70 between the two ends 38A, 38B. Alternatively, the wall 66 separating the two ends 38A, 38B may be produced in a porous material permeable to the liquid circulating in the chamber 38.

Moreover, in the example shown in FIGS. 6 and 7, the dimensions of the wall 66 are determined to leave a space between two edges of the wall 66 and an interior wall of the chamber 38 enabling the heat-transfer liquid to circulate between the two ends of the chamber 38 to reduce the temperature difference between the two ends at the same time as minimizing undesirable turbulence of the liquid.

In the example shown in FIG. 6, the inlet orifice 48A of the chamber 38 is delimited by means 72 for orienting the flow of liquid adapted to direct part of the flow along a loop B extending between the inlet orifice 48A and the wall 66 separating the upstream end 38A and the downstream end 38B of the chamber 38. This loop B makes it possible to draw liquid at low temperature injected via the inlet orifice 48A toward the wall 66 and thus to avoid liquid stagnating between the wall 66 and the inlet orifice 48A, possibly leading to an area of heterogeneous temperature of the mould 12. Moreover, thanks to the passage means 68 of the separating wall 66, liquid entrained in the loop B can also pass on the other side of the wall 66 and mix with relatively hot liquid that may also stagnate between the outlet orifice 38B and the separating wall 66.

In a variant shown in FIG. 7, the means 72 for orienting the flow of liquid are preferably also adapted to orient the flow of liquid in a direction substantially orthogonal to the axis X of the mould 12. To this end, as can be seen in FIG. 7, the orientation means 72 include a sleeve 74 bent substantially at a right angle having a first end connected to the forced circulation means 36 and a second end delimiting the inlet orifice 48A of the liquid into the chamber 38.

In this example, the direction of injection of the flow of liquid forms a polar angle $\beta$ with a straight line segment substantially tangential to the circular path of the liquid in the chamber. The value of this angle $\beta$ determines in particular the number and the dimensions of the loop or loops B.

The main operating aspects of a cooling installation of the invention are described next.

A blank tire 14 is placed in the mould 12 in the installation 10. During vulcanization, in order to homogenize the vulcanization temperatures of the sidewalls that are thinner than the tread, a cooling liquid at low temperature is caused to circulate in the channelling means.

Moreover, during vulcanization, thanks to the means 62 for reversing the direction of circulation of the liquid in the chambers, it is possible to reverse the direction of circulation of the liquid at a predetermined frequency to optimize temperature homogenization also in time.

Figure 10:
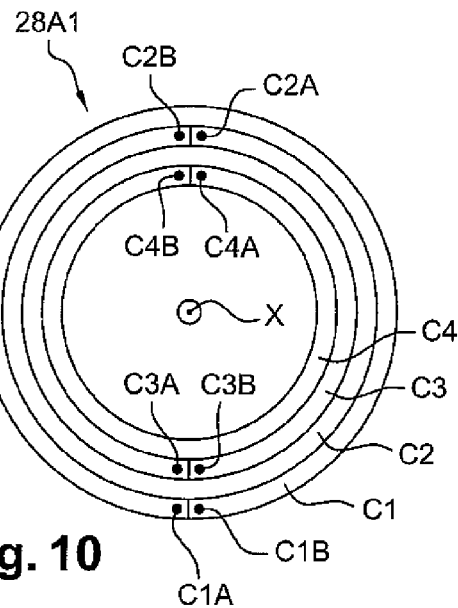
FIG. 10 is a view of channelling means of the FIG. 8 mould comprising four liquid circulation chambers.

FIGS. 8 to 10 show a temperature regulation installation of a mould of a third embodiment of the invention.

In these figures there is shown a half-mould 16 including a plurality of channelling means 28 distributed along one of the sidewalls of the tire. In these FIGS. 8 to 10, elements analogous to those of the preceding figures are designated by identical references.

Accordingly, the half-mould 16 includes eight separate channelling means 28A1 to 28A8. In this example, each of the channelling means 28A1 to 28A8 includes at least two chambers C1, C2. For example, it is seen in FIGS. 9 and 10 that the channelling means 28A1 include four chambers C1 to C4 in which the heat-transfer liquid circulates, the direction of circulation of the liquid being identical from one adjacent chamber to the other. Moreover, the adjacent upstream ends CIA to C4A and downstream ends C1B to C4B are diametrically opposite from one adjacent chamber to the other (FIG. 10).

Figure 12:
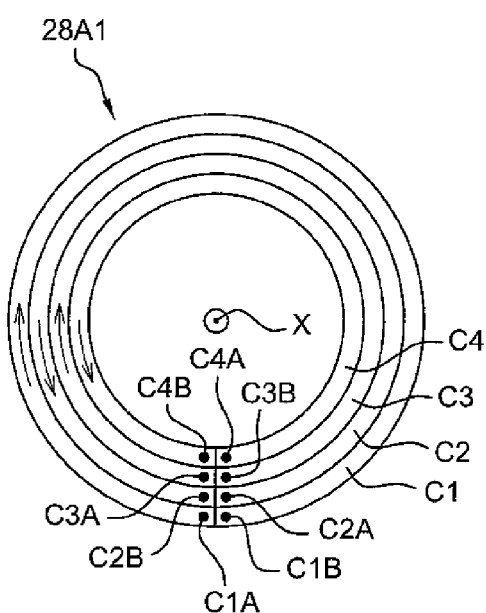
FIG. 12 is a diagrammatic view of channelling means of a mould of a fourth embodiment of the invention.

In a fourth embodiment shown in FIG. 12, the mould may include means for circulating the liquid in the chambers in opposite directions so that the directions of circulation of the liquid are opposite from one adjacent chamber to the other. In FIG. 12, elements analogous to those of FIG. 10 are designated by identical references. In this case, the upstream (respectively downstream) ends of the chambers have substantially the same angular position relative to the path of the substantially circular channelling means around the axis X.

It will be noted that, as shown in FIG. 9, the means 42 for passing liquid between the chambers C1 to C4 include orifices 46 for the heat-transfer liquid to pass from one chamber C1 to C4 to the other C4 to C1. These orifices 46 are provided in each annular wall 36 thermally coupling two chambers C1 to C4.

In this third embodiment, the channelling means 28A1 to 28A8 are disposed along the sidewall to optimize cooling of the area of the mould in contact with the sidewall being vulcanized. It is thus possible further to optimize the homogeneity of the temperatures of the areas of the mould in contact with the sidewall 24 by further increasing the number of channelling means in order to follow as closely as possible the curvilinear profile of the mould.

Thanks to the invention, because the end of the liquid path in one of the chambers coincides with the beginning of the liquid path in the other chamber, the temperature gradients are reduced in the areas of contact with the sidewalls of the mould and, during curing, the areas of heterogeneous temperature are reduced or even non-existent. On the one hand the area of the mould in contact with the sidewalls of the tire during curing of the tire can exchange heat with a heat-transfer liquid the temperature of which is substantially constant if the two chambers are considered to form a unique system. On the other hand, thanks to the thermal coupling of the two chambers encouraging thermal exchange between the chambers, the temperature gradient between the liquids circulating in the two chambers is reduced.

The invention claimed is:

1. A mould for vulcanizing a blank tire having an overall shape that is annular about an axis of revolution and includes means for channelling a cooling liquid in a substantially circular path about the axis, wherein:

the channelling means include an annular wall around the axis, separating at least two chambers in which the cooling liquid circulates as at least two different streams in parallel in the at least two chambers, an upstream end of each of the at least two chambers has substantially the same angular position with respect to the substantially circular path as a downstream end of an adjacent other one of the at least two chambers, the downstream end of each of the at least two chambers has substantially the same angular position with respect to the substantially circular path as the upstream end of the adjacent other one of the at least two chambers, and the mould additionally includes means for circulating the at least two different liquid streams in opposite directions in adjacent ones of the at least two chambers.

2. A mould for vulcanizing a blank tire having an overall shape that is annular about an axis of revolution and includes means for channelling a cooling liquid in a substantially circular path about the axis, wherein:

the channelling means include an annular wall around the axis, separating at least two chambers, in which the cooling liquid circulates as at least two different streams in parallel in the at least two chambers, a downstream end of each of the at least two chambers is disposed substantially diametrically opposite the downstream end of an adjacent other one of the at least two chambers in relation with the circular path, an upstream end of each of the at least two chambers is disposed substantially diametrically opposite the upstream end of the adjacent other one of the at least two chambers in relation with the circular path, and the mould additionally includes means for circulating the liquid in the same direction in adjacent ones of the at least two chambers.

3. The mould according to claim 1 or 2, wherein the annular wall thermally couples two adjacent chambers.

4. The mould according to claim 3, wherein the annular wall comprises a thermally conductive material.

5. The mould according to claim 1 or 2, wherein the annular wall includes passage means for passing the liquid from one chamber to an adjacent other one of the at least two chambers.

6. The mould according to claim 5, wherein the passage means include orifices for the heat-transfer liquid to pass from one chamber to the other.

7. The mould according to claim 5, wherein the passage means include an edge for the liquid to overflow along the path of any one of the at least two chambers alternately from said one of the at least two chambers to another of the at least two chambers, and then from the other chamber to said one of the at least two chambers.

8. The mould according to claim 7, wherein the area of the section of each chamber varies as a function of the angle with respect to the substantially circular path about the axis oppositely for the one chamber relative to the other chamber.

9. The mould according to claim 1 or 2, wherein the annular wall extends substantially parallel to the axis.

10. The mould according to claim 1, wherein at least one chamber includes a separating wall that separates an upstream end and a downstream end of the at least one chamber.

11. The mould according to claim 10, wherein the separating wall includes means for passing the liquid between the upstream and downstream ends of the at least one chamber.

12. The mould according to claim 10, wherein the separating wall comprises a porous material permeable to the liquid circulating in the at least one chamber.

13. The mould according to claim 10, wherein the upstream end of the at least one chamber that includes the separating wall is provided with at least one inlet orifice, the orifice is delimited by orientation means for orienting the flow of liquid adapted to direct part of the flow into a loop extending between the inlet orifice and the separating wall.

14. The mould according to claim 13, wherein the orientation means are adapted to direct part of the flow in a direction substantially orthogonal to the axis of the mould.

15. An installation for regulating the temperature of a mould according to claim 1 or 2, including means for reversing the direction of circulation of the liquid in each of the chambers of the mould at a predetermined frequency.

16. The mould according to claim 8, wherein the area of the section of each chamber decreases in the direction from an upstream end to a downstream end for each of the chambers.

* * * * *